Figure 5:
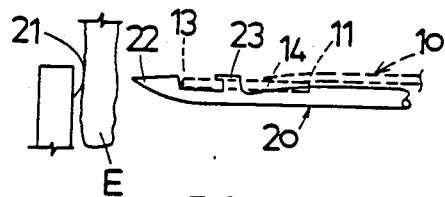

United States Patent [19]

Reggers

[11] Patent Number: 4,864,750
[45] Date of Patent: * Sep. 12, 1989

[54] EAR TAGS

[75] Inventor: Charles G. Reggers, Palmerston North, New Zealand

[73] Assignee: Allflex International Limited, Palmerston North, New Zealand

[*] Notice: The portion of the term of this patent subsequent to Apr. 26, 2005 has been disclaimed.

[21] Appl. No.: 151,636

[22] Filed: Feb. 1, 1988

Related U.S. Application Data

[63] Continuation of Ser. No. 301,013, Sep. 10, 1988, Pat. No. 4,739,565.

[51] Int. Cl.4 .............................................. G09F 3/00
[52] U.S. Cl. ....................................................... 40/301
[58] Field of Search ............... 40/300, 301, 302, 20 A, 40/22; 292/307, 316; 24/16 PB; D 30/155

[56] References Cited

U.S. PATENT DOCUMENTS

| D. 215,942 | 11/1969 | Jackson | D30/155 |
| 1,174,299 | 3/1916 | Taylor | 40/300 |
| 3,334,433 | 8/1967 | Gospodnetich | 40/301 |
| 3,468,050 | 9/1969 | Pool | 24/16 PB |
| 3,605,310 | 9/1971 | Brown | 40/301 |
| 3,934,368 | 1/1976 | Fearing | 40/301 |
| 3,952,439 | 4/1976 | Armand | 40/301 |
| 3,965,602 | 6/1976 | Whitney | 40/301 |
| 4,000,744 | 1/1977 | Ritchey | 40/301 |

FOREIGN PATENT DOCUMENTS

| 395648 | 3/1909 | France | 40/301 |
| 2239938 | 10/1973 | France | 40/301 |
| 2323322 | 9/1975 | France | 40/301 |
| 145800 | 7/1966 | New Zealand | 40/301 |

Primary Examiner—John J. Wilson
Attorney, Agent, or Firm—Blakely, Sokoloff, Taylor & Zafman

[57] ABSTRACT

A one piece identification tag which is formed from a flexible material. The tag comprises a panel on which identification indicia can be applied. A neck portion extends from the panel and terminates in a head portion. The head portion has a pair of flaps which project backwardly therefrom toward the panel with a flap being situated either side of the neck portion.

6 Claims, 2 Drawing Sheets

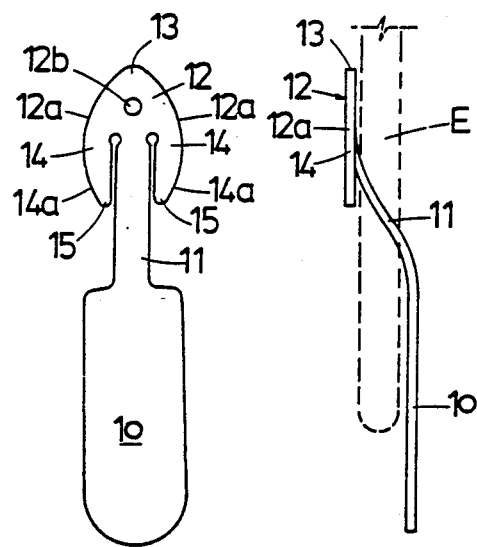
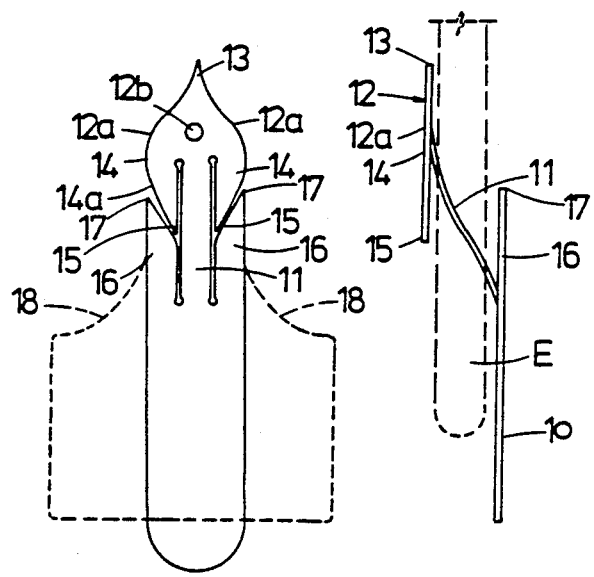

EAR TAGS

This is a continuation of application Ser. No. 06/301,013 filed Sept. 10, 1988, now U.S. Pat. No. 4,739,565.

This invention relates to an identification tag and more particularly but not exclusively to a tag of a type which is ordinarily inserted into the ear of an animal.

Animal identification by means of a tag inserted in or attached to the ear of an animal is well known. Basically such ear tags can be grouped into two categories. The first category is the so-called two-piece tags typical examples of which are disclosed in U.S. Patent Specification No. 3260007 of Hayes, U.S. Patent Specification No. 3731414 of Murphy et. al., and U.S. Patent Specifiction No. 3214856 of Brierley. The second category is one-piece tags and a typical example of such a tag is to be found in New Zealand Patent Specification No. 145800 of Ritchey.

Two-piece ear tags generally consist of a male component and a female component. The male component has a headed stem whilst the female component has an opening through which the headed portion of the stem can pass to form a snap lock type coupling between the male and female components. Conventionally two-piece ear tags were constructed so that at least the male component was made of a rigid material. The stem of the male component was thus sufficiently rigid for it to be pushed through the ear of an animal with the headed portion of the stem passing through the opening in the female component positioned on the opposite side of the ear. Considerable difficulties arose with these tags as they were easily snagged in obstacles such as fences, trees etc with the result that the ear of the animal could be damaged or the tag removed from the ear due to the efforts of the animal to free the snagged tag.

Over many years efforts were made to devise tags which could be readily freed if they became snagged and an example of such a tag is illustrated in U.S. Patent Specification No. 3214856 of Brierley. This tag was constructed such that the male and female components could move relative to one another by the female component being rotatable on the stem of the male component. These tags were, however, not successful as they were still prone to snagging due to the rigid nature of the components.

As a result of the failure to devise two-piece tags which were non-snaggable the one-piece flexible tag was developed. This tag was formed of a flexible material and an example of such a tag is to be found in the prior referenced New Zealand Patent Specification No. 145800. Whilst these tags did to a large extent overcome the problem of snagging, they need to be installed in the ear of an animal with a trocar type tool which formed a large slit in the ear of the animal. Often the slit would not heal with the result that the ear tag would become lost. In addition the head portion of the tag tended to fold over when any pulling force was applied to the tab portion with the result that the folded over head portion could be pulled through the opening in the animals ear. Whilst the problems of snagging had to a large extent been overcome the identification of animals became difficult due to the high loss rate of tags.

The two-piece tag disclosed in the aforemention U.S. Patent Specification No. 3731414 has, however, been highly successful in that both the male and female components are made of a flexible material the tag can be applied by a pliers type applicator and during application ony a small aperture is formed in the ear of the animal. A tag was thus one which could be easily applied, was fully flexible and remained in the ear of the animal. Such a tag is, however, relatively expensive due to it being formed of two components and the manufacturing costs associated therewith.

There is, however, still a need for a one-piece flexible tag which can be readily installed in the ear of an animal and is readily retainable therein. To overcome the problem normally associated with the large slit formed in the ear of an animal by the trocar type applicator the one-piece tag must be of such a construction that it can be installed in the ear of the animal by an applicator which only produces a small aperture or slit in the animal's ear. The tag must also be of such a construction that it cannot be readily pulled from the ear of the animal. The object of the present invention is to provide such a tag.

In its broadest aspect the invention provides a one-piece identification tag formed from a flexible material comprising a panel, a neck portion extending from the panel, the neck portion terminating in a head portion having a pair of flap portions projecting therefrom toward the panel one either side of the neck portion.

Figure 6:
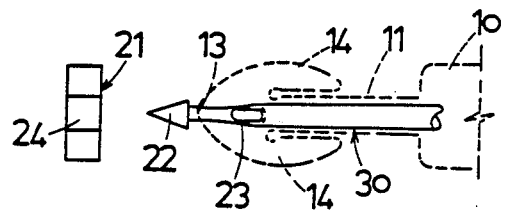
Figure 7:
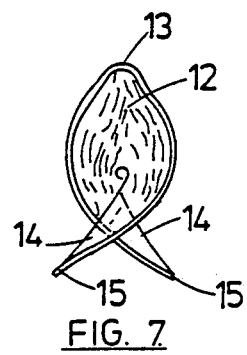
Figure 8:
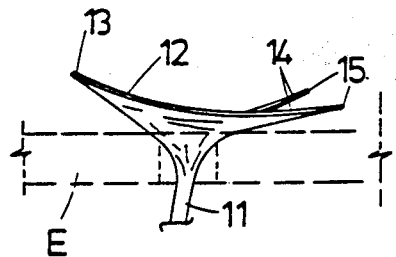

To more fully describe the invention according to its preferred form reference will be made to the accompanying drawings in which:

FIG. 1 is a plan view of one form of the ear tag according to the present invention, FIG. 2 is a side elevational view generally showing the configuration of the tag when installed in an animal's ear, FIG. 3 is a plan view of a second form of the ear tag according to the present invention, FIG. 4 is a similar view to that of FIG. 2 but showing the tag of FIG. 3, FIG. 5 is a side view of part of an applicator tool for installing the tag in the ear of an animal, FIG. 6 is a plan view of the arrangement shown in FIG. 5, FIG. 7 is a plan view of the head portion of the tag when a pulling force is applied to the neck portion when the tag is in an animal's ear, and FIG. 8 is a side view of the head portion as shown in FIG. 7.

The tag is extremely economic to manufacture as it can be either injection moulded or stamped from a sheet of flexible material. Any suitable flexible material can be employed though it is envisaged that preferred materials will include polyurethane, natural or synthetic rubber, or like plastics material. Polyurethane is, for example, well known to be suitable for animal ear tags.

The tag consists of a panel 10 which can carry indentification indicia such as symbols or numbers. This indicia can be applied in any known manner, for example by inking pens, hot stamping a suitable inking foil or stick on numbers. Referring firstly to FIGS. 1 and 2 the panel 10 has a neck portion 11 which extends therefrom and lies in the same plane as panel 10. The outer end of neck portion 11 terminates in a head portion 12 which has curved peripheral edges 12a so that the head portion is shaped to taper to a point or leading end 13. Extending rearwardly, i.e. back toward panel 10, from head 12 are a pair of flap portions 14. The outer peripheral edge 14a of each flap 14 is of curved shape (as an extension of the curved edge 12a of head portion 12) so in effect the flap portions 14 taper rearwardly to free ends 15 with the result that the general appearance of the head portion 12 and flaps 14 is tear-drop shaped when viewed in plan. An opening 12b is formed in head portion 12 adjacent point 13.

Referring now to FIGS. 3 and 4 a second form of the tag is illustrated. Extending outwardly from panel 10 are a second pair of flap portions 16 which project toward head portion 12 and flaps 14. These second flap portions 16 have a shaped free end 17 so that the terminal ends of flap portions 14 and 16 overlap as can be clearly seen in FIG. 3. The overall width between the outer peripheral edges of flap portions 16 is substantially the same as the overall width of the head portion 12 as can once again be clearly seen in FIG. 3.

When panel 10 is of the larger proportions shown in dotted detail in FIG. 3 the flap portions 16 have their outer peripheral edges blending into the panel 10 by curved shoulder portions 18. These curved shoulder portions 18 are of a similar curvature to the peripheral edges 12a and 14a of head portion 12 and flaps 14 respectively. When the tag is of this configuration a number of tags can be stamped from a sheet of flexible material without any undue wastage.

The tag is installed in an animal's ear by a suitable applicator tool such as a trocar or pliers type applicator. In the latter case the tool has a driving member and an ear support surface. During application the driving member drives the head portion 12 through the ear while the reverse side of the ear is supported by the supported surface. By way of example a driving member and support surface is shown in FIGS. 5 and 6. These elements can be part of a conventional pliers type applicator tool with the driving member being coupled by a linkage to a handle pivotally mounted to a body. The support surface is fixedly attached to said body. With a trocar type tool the trocar can be formed by a driving member similar to that shown in FIGS. 5 and 6 with a suitable handle affixed thereto.

The driving member 20 is movable rectilinearly with respect to support surface 21. The extreme end of driving member 20 is pointed as at 22. Spaced away from pointed end 22 is a lug 23. Opening 12b in head portion 12 of the tag is located on lug 23 so that the extreme end 13 of head portion 12 is located immediately behind end 22.

An animal's ear E is located between pointed end 22 and support surface 21 and the driving member 20 moved toward the ear drawing with it head portion 12. The pointed end 22 punctures the ear E and draws through head portion 12. Due to the small opening formed in ear E by pointed end 22 the flap portions 14 fold down to lie alongside the driving member during the passage of the head portion through the ear. An open ended slot or aperture 24 is formed in support surface 21 to allow for the pointed end 22 to protrude therein.

Once head portion 12 and flap portions 14 have passed through the animal's ear the driving member can be withdrawn. As the flap portions 14, once clear of ear E, resume their projecting disposition they prevent head 12 being withdrawn from the ear and lug 23 disengages from opening 12b leaving driving member 20 free to withdraw.

By virtue of the construction of the tag the diameter of the point end 22 is of small dimensions and for the size of tag illustrated is generally in the order of 4-6 mm. Accordingly when pointed end 22 is formed through the ear the resultant aperture is considerably less than that formed by the trocar applicators normally used to install the known types of one-piece tags. The problems associated with known applicators where large apertures or slits are formed in the animal's ear largely do not exist with the tag of the present invention.

With the driving member 20 withdrawn from the animal's ear the head portion 12 and flap portions 14 are situated to one side of the ear and the panel 10 (with the flap portions 16 in the second form of the tag) to the other side of the ear (see FIGS. 2 and 4). When installed in the ear the tag cannot be withdrawn due to the fact that any pulling force applied to the head portion 12 via neck 11 causes ends 15 of flap portions 14 to overlap with the result that the flap portions 14 and head portion 12 form a generally conical shape (see FIGS. 7 and 8) which is of substantially greater cross-sectional area than the aperture which is in the ear of the animal.

The tag is extremely economical to manufacture as it can, for example, be simply formed by stamping from a sheet of flexible material. Unlike known one-piece tags the tag is installed with a tool which is of such a cross sectional area that only a small aperture is formed in the ear of the animal and thus the healing problems normally associated with the large wounds resulting from the conventional trocar applicators do not occur. Accordingly, the wound in the animal's ear quickly heals and overcomes the problem of retention of the tag during this healing process.

As the tag readily takes up the form shown in FIGS. 2 and 4 when in the animal's ear it is not necessary to form a bend in the neck during manufacture. Accordingly, the head portion 12 when installed remains in the disposition where it points away from the panel 10 unlike many known one piece tags where the head portion is disposed back toward the panel of the tag.

Whilst the identification tag has been described herein as being primarily suitable for use as an animal's ear tag it can be used for other purposes. For example, the tag can be equally useful for pricing products such as clothing.

I claim:

1. A one-piece identification tag formed from a flexible material comprising,
a panel,
a neck portion extending forward from said panel,
a head portion connected to the end of said neck portion which is furthest from said panel, said head portion having a forward end, which is the part of said head which is furthest from the region where said head portion is connected to said neck portion, and opposite side edges which diverge rearwardly from said forward end of said head portion, said opposite side edges of said head portion curving convexly outwardly away from the forward end of said head portion, said head portion being widest at the region where said head portion is connected to said neck portion, a pair of flap portions projecting rearwardly from said head portion and being located one on each side of said neck portion, said flap portions lying substantially in the same plane as said head portion, each of said flap portions tapering toward a rearward terminal end, each of said flap portions being widest at the region where it is connected to said head portion, said terminal ends of said flap portions being located a transverse distance apart which is less than the greatest transverse distance between the side edges of said head portion, whereby, when said tag is in place in an object to be identified, that is, with said head and flap portions on one side of the object and said panel on the other side of the object with said neck extending through a narrow aperture in the object, and pulling force is applied to said head portion via said neck portion, said head portion and said flap portions form a generally conical shape and said rearward terminal ends of said flap portions are drawn toward each other.

2. A tag as claimed in claim 1 wherein an opening for engagement with a locating lug of an applicator tool is formed in the head portion between said forward end of said head portion and said region where said head portion is connected to said neck portion.

3. A tag as claimed in claim 1 wherein the neck, head and flap portions are substantially all of uniform cross-sectional thickness and lie in the same plane.

4. A tag as claimed in claim 1 wherein each flap portion has an inner side edge which is substantially parallel to the adjacent edge of the neck portion and each flap portion has an outer side edge which curves convexly from the region where the flap is connected to the head portion toward said flap's rearward terminal end.

5. A tag as claimed in claim 4 wherein the outer side edge of each flap portion extends as a smooth transition of the corresponding side edge of said head portion.

6. A tag as claimed in claim 1, said flap portions projecting rearwardly from said head portion being first flap portions, said tag further including a second pair of flap portions which extend forwardly from said panel, one on each side of said neck portion, toward said first pair of flap portions.

* * * * *